US012739605B2

(12) United States Patent
Tam et al.

(10) Patent No.: US 12,739,605 B2
(45) Date of Patent: Sep. 15, 2026

(54) AUTONOMOUS VEHICLE COMMUNICATION GATEWAY ARCHITECTURE

(71) Applicant: TuSimple, Inc., San Diego, CA (US)

(72) Inventors: Joyce Tam, Pleasanton, CA (US); Han Tang, Sunnyvale, CA (US); Neil M. Overmon, Redwood City, CA (US); Sridhar Kumar, Fremont, CA (US)

(73) Assignee: CreateAI, Inc., San Diego, CA (US)

( * ) Notice: Subject to any disclaimer, the term of this patent is extended or adjusted under 35 U.S.C. 154(b) by 939 days.

(21) Appl. No.: 18/068,567

(22) Filed: Dec. 20, 2022

(65) Prior Publication Data

US 2023/0199450 A1 Jun. 22, 2023

Related U.S. Application Data

(60) Provisional application No. 63/292,281, filed on Dec. 21, 2021, provisional application No. 63/292,275, filed on Dec. 21, 2021.

(51) Int. Cl.

| | |
|---|---|
| ***H04W 4/46*** | (2018.01) |
| ***H04W 4/12*** | (2009.01) |
| ***H04W 12/06*** | (2021.01) |

(52) U.S. Cl.

CPC ............... *H04W 4/46* (2018.02); *H04W 4/12* (2013.01); *H04W 12/06* (2013.01)

(58) Field of Classification Search

CPC ......... H04W 4/46; H04W 4/40; H04W 4/029; H04W 4/44; H04W 4/48; H04W 4/12;

(Continued)

(56) References Cited

U.S. PATENT DOCUMENTS

| | | | |
|---|---|---|---|
| 11,472,433 | B2 | 10/2022 | Yoo |
| 2015/0203112 | A1 | 7/2015 | Duncan |

(Continued)

FOREIGN PATENT DOCUMENTS

| | | | |
|---|---|---|---|
| DE | 10 2014 226232 | A1 | 6/2016 |
| DE | 10 2015 226232 | A1 | 6/2017 |

(Continued)

OTHER PUBLICATIONS

International Search Report and Writtent Opinion for PCT/US2022/072633, Mailing Date: Aug. 26, 2022, 17 pages.

(Continued)

*Primary Examiner* — Marcus Hammonds

(74) *Attorney, Agent, or Firm* — Ashurst Perkins Coie US LLP

(57) ABSTRACT

A gateway processor coordinates communication among an autonomous vehicle components boundary domain, a vehicle boundary domain, and an oversight server. The gateway processor receives a message from the oversight server. The gateway processor determines a priority level, a domain tag data, and destination data associated with the message. The priority level indicates a scheduling requirement associated with the message. The domain tag data indicates that the message is associated with a particular domain from among the autonomous vehicle components boundary domain, the vehicle components boundary domain, or the security domain. The destination data indicates that the message is designated to a particular component within the particular domain. In response, the gateway processor schedules the message to be transmitted to the particular domain. The gateway processor routes the message to the particular component.

18 Claims, 6 Drawing Sheets

(58) Field of Classification Search
CPC ........ H04W 12/06; H04L 67/12; H04L 45/00; H04L 47/50; H04L 47/24
See application file for complete search history.

(56) References Cited

U.S. PATENT DOCUMENTS

| | | | |
|---|---|---|---|
| 2018/0297593 | A1 | 10/2018 | Pitale |
| 2019/0049994 | A1 | 2/2019 | Pohl et al. |
| 2019/0291726 | A1 | 9/2019 | Shalev-Shwartz et al. |
| 2020/0062249 | A1 | 2/2020 | Light et al. |
| 2020/0079368 | A1 | 3/2020 | Yamada |
| 2020/0342760 | A1 | 10/2020 | Vassilovski |
| 2021/0039650 | A1 | 2/2021 | Yu |
| 2021/0056844 | A1 | 2/2021 | Park |

FOREIGN PATENT DOCUMENTS

| | | | |
|---|---|---|---|
| DE | 10 2018 209653 | A1 | 12/2019 |
| DE | 10 2018 218973 | A1 | 5/2020 |
| DE | 102019216916 | A1 | 5/2021 |

OTHER PUBLICATIONS

Polizei Bremerhaven: “Achtung Schwertransporte”, Oct. 18, 2016, retrieved from the Internet, URL: https://www.facebook.com/groups/279994258699806/posts/2159252740773939/, retrieved on Aug. 11, 2022.

Komando Streitkraftebasis, Bonn: “Achtung Kolonne So verhalten Sie sich richtig”, Mar. 1, 2020, retrieved from the internet, URL: https://www.bundeswehr.de/resource/blob/179422/8f2a090d36f45698dcdl709512063bba/flyer-achtung-kolonne-so-verhalten-sich-sich-richtig-data.pdf, retrieved on Aug. 11, 2022.

Security and Privacy Controls for Information Systems and Organizations, Joint Task Force, National Institute of Standards and Technology, U.S. Department of Commerce, NIST Special Publication 800-53, Revision 5, Sep. 2020, includes updates as of Dec. 12, 2020, 492 pages.

TransAid D5.3 Protocols for reliable V2X message exchange, ART-05-206, GA Nr 723390, TransAID, Transition Areas for Infrastructure-Assisted Driving.

International Search Report and Written Opinion for Application No. PCT/US2022/082018, mailed Apr. 5, 2023.

AUTONOMOUS VEHICLE COMMUNICATION GATEWAY ARCHITECTURE

PRIORITY

The application claims priority to U.S. Provisional Application No. 63/292,275 filed Dec. 21, 2021, and titled "SYSTEM AND METHOD FOR AN AUTONOMOUS VEHICLE," and U.S. Provisional Application No. 63/292,281 filed Dec. 21, 2021, and titled "SYSTEM AND METHOD FOR AN AUTONOMOUS VEHICLE," which are both incorporated herein by reference.

TECHNICAL FIELD

The present disclosure relates generally to autonomous vehicles. More particularly, the present disclosure is related to an autonomous vehicle communication gateway architecture.

BACKGROUND

One aim of autonomous vehicle technology is to provide vehicles that can safely navigate with limited or no driver assistance. Various internal components of an autonomous vehicle communicate messages and instructions to one another to facilitate the autonomous and mechanical operations of the autonomous vehicle.

SUMMARY

This disclosure recognizes various problems and previously unmet needs related to autonomous vehicle communication, and more specifically to the lack of efficiency in data communication and data routing for internal and external communication for autonomous vehicles. Certain embodiments of the present disclosure provide unique technical solutions to technical problems of current autonomous vehicle technologies, including those problems described above to improve autonomous vehicle communication technology.

The disclosed system provides improvements to the autonomous vehicle communication technology, for example, by improving the data routing or data communication among the components of an on-board control device associated with the autonomous vehicle. In one example, the disclosed system improves the data routing among the components of the control device by establishing particular boundary domains for various components of the control device. For example, the disclosed system may establish an autonomous vehicle components boundary domain that includes a first set of components configured to facilitate autonomous operations of the autonomous vehicle. In another example, the disclosed system may establish a vehicle components boundary domain that includes a second set of components configured to facilitate non-autonomous operations of the autonomous vehicle. In another example, the disclosed system may establish a security boundary domain that includes a third set of components configured to facilitate authentication of components in the control device, authentication of messages received from an external device (e.g., an oversight server, etc.), messages received from an internal component with respect to the control device (e.g., any component in a boundary domain to another).

The disclosed system is configured to establish trusted communication paths among any combination of the boundary domains. For example, the disclosed system is configured to provide initial security keys to each component in each boundary domain, and query the security key from the component for authenticating the component (e.g., in response to receiving a request from the component to initiate a communication with another component). If the received security key matches or corresponds to an initially provided security key, it is determined that the component is authenticated, and communication from the component is safe and trusted.

The disclosed system is further configured to provide improvement to data routing technology, in general, and to data routing between components of the autonomous vehicle, in specific. For example, upon receiving a message, the control device may evaluate the received message and determine its priority level. If the priority level of the message is determined to be high (e.g., as indicated by priority flag bits or priority data field included in the message), the control device may move the message to be on top of a scheduling queue, or route the message to a particular scheduling queue that is dedicated for messages with high priority levels. Similarly, if the priority level of the message is determined to be medium (e.g., as indicated by priority flag bits or priority data field included in the message), the control device may route the message to a particular scheduling queue that is dedicated to messages with medium priority levels; and if the priority level of the message is determined to be low (e.g., as indicated by priority flag bits or priority data field included in the message), the control device may route the message to a particular scheduling queue that is dedicated for messages with low priority levels. In this manner, if a particular message includes particular instructions that need to be executed more urgently than other messages, the particular message may be associated with the high priority level, and its execution may be prioritized or escalated. Thus, the disclosed system improves the underlying operation of the autonomous vehicle, and network communication among components of the autonomous vehicle. This, in turn, leads to improving the autonomous vehicle navigation technology, for example, by escalating the execution of messages with high priority levels, instructions that may include urgent navigation instructions or any other suitable instruction/information may be accessed and acted upon quicker compared to the current autonomous vehicle navigation technology. This leads to providing safer driving conditions and experiences for autonomous vehicles, surrounding vehicles, and pedestrians.

In one embodiment, a system comprises a memory and a gateway processor. The memory is configured to store a first message. The gateway processor is operably coupled to the memory. The gateway processor is configured to coordinate communications among an autonomous vehicle components boundary domain, a vehicle components boundary domain, and an oversight server. The gateway processor receives the first message from the oversight server. The first message is associated with one of the autonomous vehicle components boundary domain, the vehicle components boundary domain, or a security domain. The security domain comprises a set of components configured to facilitate authentication of received messages. The gateway processor determines a priority level associated with the first message, wherein the priority level associated with the first message indicates a scheduling requirement associated with the first message. The gateway processor identifies a domain tag data associated with the first message, wherein the domain tag data indicates that the first message is associated with a particular domain from among the autonomous vehicle components boundary domain, the vehicle components boundary domain, or the security domain. The gateway processor identifies a destination data associated with the first message, wherein the destination data indicates that the first message is designated to a particular component within the particular domain. The gateway processor schedules the first message to be transmitted to the particular domain based at least in part upon the priority level associated with the first message and the identified domain tag data. The gateway processor routes the first message to the particular component based at least in part upon the destination data.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions to facilitate secured and trusted communication among various components of an autonomous vehicle and route and schedule an incoming message. The present disclosure provides various systems, methods, and devices to facilitate secured and trusted communication among various components of an autonomous vehicle and route and schedule an incoming message. Embodiments of the present disclosure and its advantages may be understood by referring to FIGS. 1 through 6. FIGS. 1 through 6 are used to describe a system and method to facilitate secured and trusted communication among various components of an autonomous vehicle and route and schedule an incoming message.

System Overview

Figure 1:
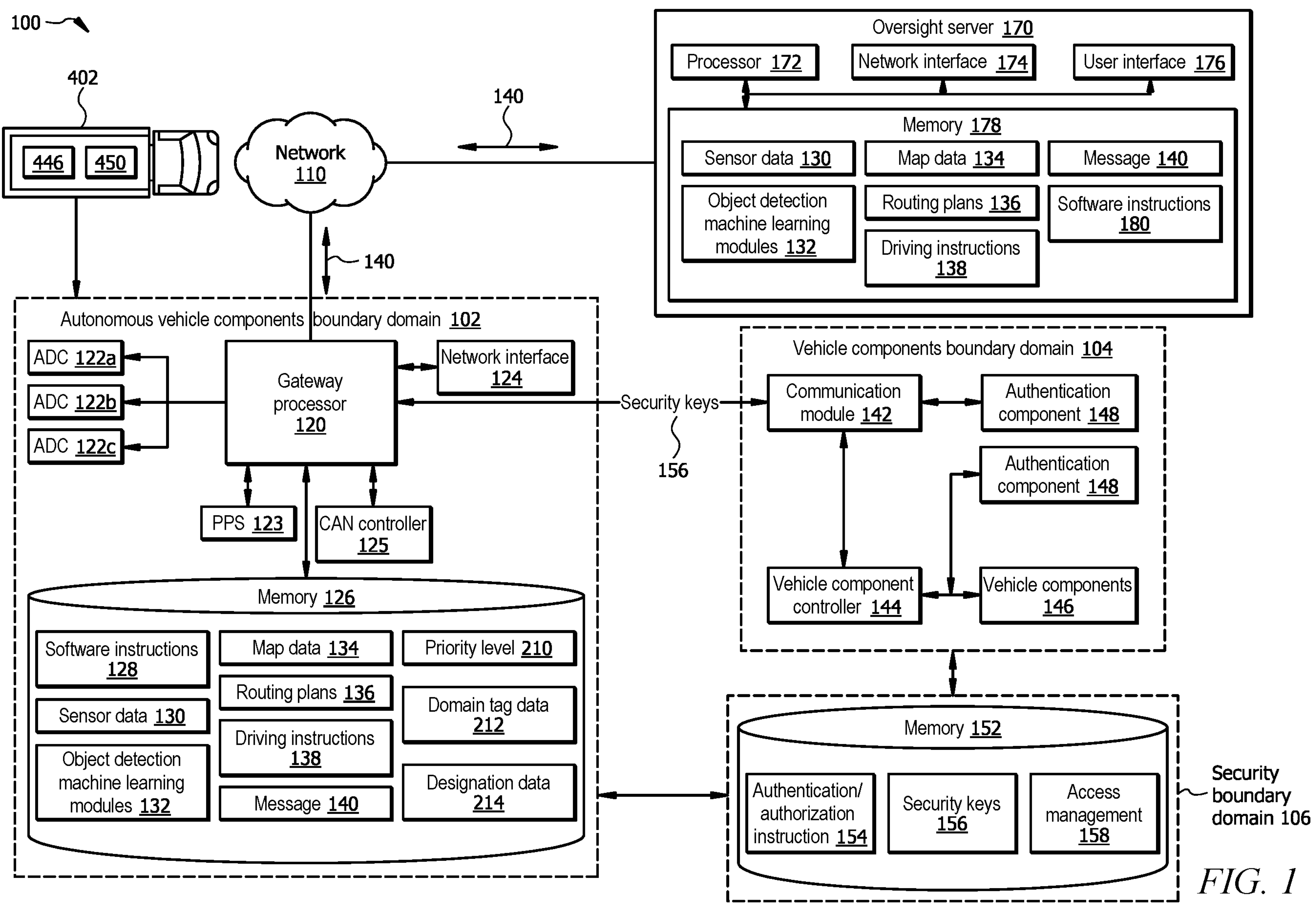
FIG. 1 illustrates an embodiment of a system configured to facilitate secured and trusted communication among various components of an autonomous vehicle and route and schedule an incoming message.

FIG. 1 illustrates an embodiment of a system 100 configured to implement a communication gateway architecture for autonomous vehicles 402 to facilitate secured and trusted communication among various components of the autonomous vehicle 402. In certain embodiments, the system 100 comprises the autonomous vehicle 402 communicatively coupled with an oversight server 170 via a network 110. Network 110 enables communication among the components of the system 100. Network 110 allows the autonomous vehicle 402 to communicate with other autonomous vehicles 402, systems, oversight server 170, databases, devices, etc. The autonomous vehicle 402 comprises a control device 450. The control device 450 comprises a gateway processor 120 is signal communication with a memory 126. Memory 126 stores software instructions 128 that when executed by the gateway processor 120 cause the gateway processor 120 to perform one or more operations described below. The oversight server 170 comprises a processor 172 in signal communication with a memory 178. Memory 178 stores software instructions 180 that when executed by the processor 172 cause the oversight server 170 to perform one or more operations described herein. In other embodiments, system 100 may not have all of the components listed and/or may have other elements instead of, or in addition to, those listed above. System 100 may be configured as shown or in any other configuration.

In general, the system 100 provides improvements to the autonomous vehicle technology, for example, by improving the data routing or data communication among the components of the control device 450. In one example, the system 100 may improve the data routing among the components of the control device 450 by establishing particular boundary domains for various components of the control device 450. For example, the system 100 may establish the autonomous vehicle components boundary domain 102 that includes a first set of components configured to facilitate autonomous operations of the autonomous vehicle 402. In another example, the system 100 may establish the vehicle components boundary domain 104 that includes a second set of components configured to facilitate non-autonomous operations of the autonomous vehicle 402. In another example, the system 100 may establish the security boundary domain 106 that includes a third set of components configured to facilitate authentication of components in the control device 450, authentication of messages 140 received from an external device (e.g., oversight server 170, etc.), messages 140 received from an internal component with respect to the control device 450 (e.g., any component in a boundary domain to another).

The system 100 is configured to establish trusted communication paths among any combination of the boundary domains 102, 104, 106 using the security boundary domain 106. For example, the system 100 is configured to provide initial security keys 156 to each component in each boundary domain 102, 104, and 106, and query the security key 156 from the component for authenticating the component (e.g., in response to receiving a request from the component to initiate a communication with another component). If the received security key 156 matches or corresponds to an initially provided security key 156, it is determined that the component is authenticated, and communication from the component is safe and trusted.

The system 100 is further configured to provide improvement to data routing technology, in general, and to data routing between components of the autonomous vehicle, in specific. For example, upon receiving a message 140 (from an external device, such as the oversight server 170), the control device 450 may evaluate the received message 140 and determine its priority level 210. If the priority level 210 of the message 140 is determined to be high (e.g., as indicated by priority flag bits or priority data field included in the message 140), the control device 450 may move the message 140 to be on top of a scheduling queue, or route the message 140 to a particular scheduling queue that is dedicated for messages 140 with high priority levels. Similarly, if the priority level 210 of the message 140 is determined to be medium (e.g., as indicated by priority flag bits or priority data field included in the message 140), the control device 450 may route the message 140 to a particular scheduling queue that is dedicated for messages 140 with medium priority levels; and if the priority level 210 of the message 140 is determined to be low (e.g., as indicated by priority flag bits or priority data field included in the message 140), the control device 450 may route the message 140 to a particular scheduling queue that is dedicated for messages 140 with low priority levels. In this manner, if a particular message 140 includes particular instructions that need to be executed more urgently than other messages, the particular message 140 may be associated with the high priority level, and its execution may be prioritized. Thus, system 100 improves the underlying operation of the autonomous vehicle, and network communication among components of the autonomous vehicle 402. This, in turn, leads to improving the autonomous vehicle navigation technology, for example, by escalating the execution of messages with high priority levels, instructions that may include navigation instructions, updated map data 134, or any other suitable instruction/information may be accessed and acted upon quicker compared to the current autonomous vehicle navigation technology. This leads to providing safer driving conditions and experience for the autonomous vehicle 402, surrounding vehicles, and pedestrians.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 4:
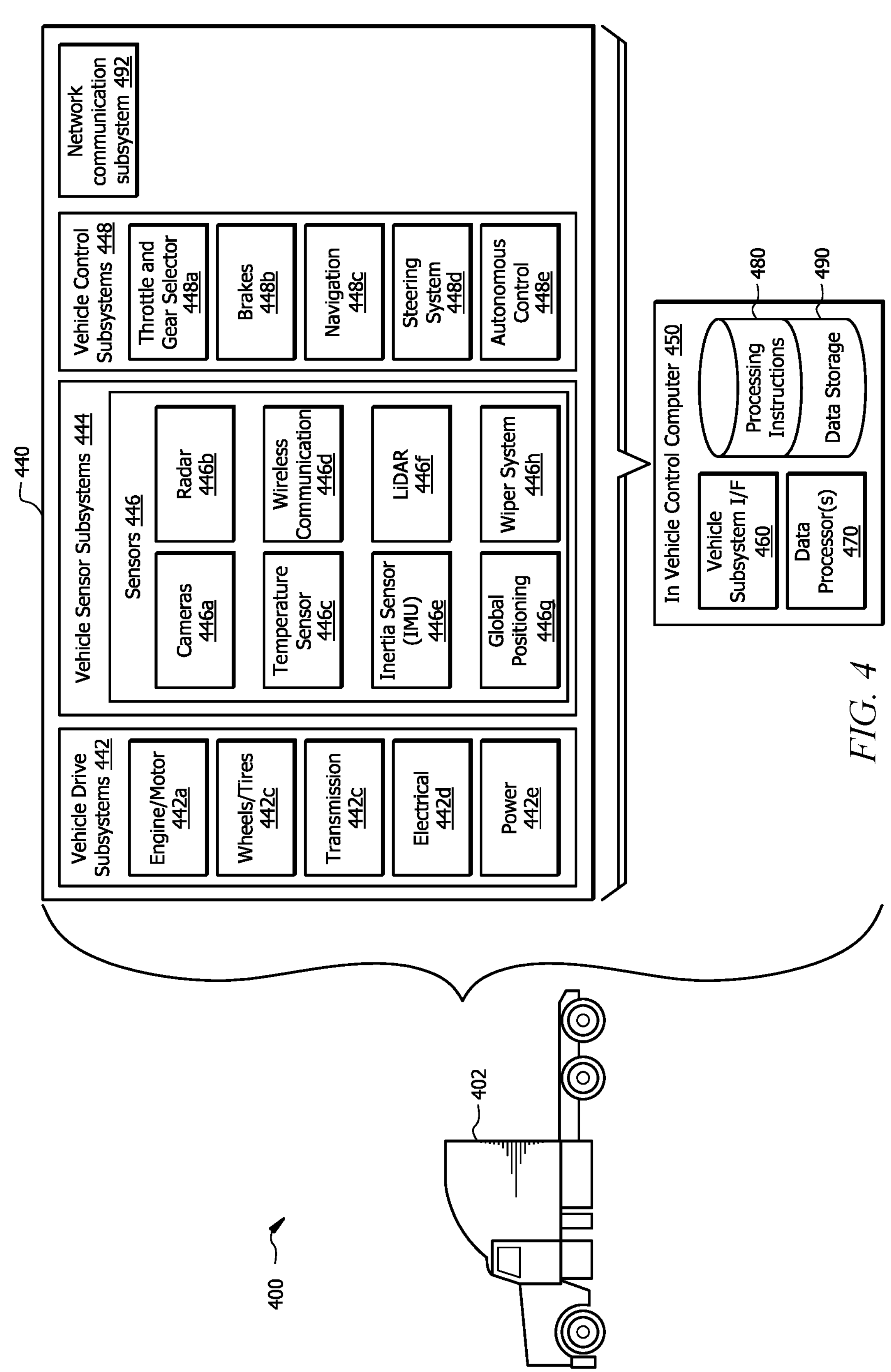
FIG. 4 illustrates a block diagram of an example autonomous vehicle configured to implement autonomous driving operations.

In one embodiment, the autonomous vehicle 402 may include a semi-truck tractor unit attached to a trailer to transport cargo or freight from one location to another location (see FIG. 4). The autonomous vehicle 402 is generally configured to travel along a road in an autonomous mode. The autonomous vehicle 402 may navigate using a plurality of components described in detail in FIGS. 4-6. The operation of the autonomous vehicle 402 is described in greater detail in FIGS. 4-6. The corresponding description below includes brief descriptions of certain components of the autonomous vehicle 402.

Control device 450 may be generally configured to control the operation of the autonomous vehicle 402 and its components and to facilitate autonomous driving of the autonomous vehicle 402. The control device 450 may be further configured to determine a pathway in front of the autonomous vehicle 402 that is safe to travel and free of objects or obstacles, and navigate the autonomous vehicle 402 to travel in that pathway. This process is described in more detail in FIGS. 4-6. The control device 450 may generally include one or more computing devices in signal communication with other components of the autonomous vehicle 402 (see FIG. 4). In this disclosure, the control device 450 may interchangeably be referred to as an in-vehicle control computer 450.

The control device 450 may be configured to detect objects on and around a road traveled by the autonomous vehicle 402 by analyzing the sensor data 130 and/or map data 134. For example, the control device 450 may detect objects on and around the road by implementing object detection machine learning modules 132. The object detection machine learning modules 132 may be implemented using neural networks and/or machine learning algorithms for detecting objects from images, videos, infrared images, point clouds, audio feed, Radar data, etc. The object detection machine learning modules 132 are described in more detail further below. The control device 450 may receive sensor data 130 from the sensors 446 positioned on the autonomous vehicle 402 to determine a safe pathway to travel. The sensor data 130 may include data captured by the sensors 446.

Sensors 446 may be configured to capture any object within their detection zones or fields of view, such as landmarks, lane markers, lane boundaries, road boundaries, vehicles, pedestrians, road/traffic signs, among others. In some embodiments, the sensors 446 may be configured to detect rain, fog, snow, and/or any other weather condition. The sensors 446 may include a detection and ranging (LiDAR) sensor, a Radar sensor, a video camera, an infrared camera, an ultrasonic sensor system, a wind gust detection system, a microphone array, a thermocouple, a humidity sensor, a barometer, an inertial measurement unit, a positioning system, an infrared sensor, a motion sensor, a rain sensor, and the like. In some embodiments, the sensors 446 may be positioned around the autonomous vehicle 402 to capture the environment surrounding the autonomous vehicle 402. See the corresponding description of FIG. 4 for further description of the sensors 446.

Control Device

The control device 450 is described in greater detail in FIG. 4. In brief, the control device 450 may facilitate the autonomous driving of the autonomous vehicle 402. In the illustrated embodiment, the control device 450 includes the autonomous vehicle components boundary domain 102, the vehicle components boundary domain 104, and security boundary domain 106. The control device 450 may establish these boundary domains based on the operations of various components of autonomous vehicle 402.

Autonomous Vehicle Components Boundary Domain

The autonomous vehicle components boundary domain 102 may include a first set of components configured to facilitate the autonomous operations of the autonomous vehicle 402. For example, the components in the autonomous vehicle components boundary domain 102 may be configured to engage the autonomous driving of the autonomous vehicle 402, e.g., from a non-autonomous state to an autonomous state, execute various software instructions 128 for perception, actuation, control 570 (see FIG. 5), planning 562 (see FIG. 5), object detection (e.g., LiDAR-based object detection module 512 of FIG. 5, image-based object detection module 518 of FIG. 5, machine learning object detection module 132), among others. The autonomous vehicle components boundary domain 102 may include the gateway processor 120, one or more autonomous drive compute (ADS) units 122*a-c*, a pulse per second (PPS) synchronization unit 123, a network interface 124, a controller area network (CAN) controller 125, and a memory 126. The components of the autonomous vehicle components boundary domain 102 are operably coupled to each other through wires and/or wireless communication.

The gateway processor 120 in signal communication with the ADC units 122*a-c*, PPS unit 123, network interface 124, CAN controller 125, memory 126, and other components in other domains 104, 106. The gateway processor 120 may include one or more processing units that perform various functions as described herein. The memory 126 may store any data and/or instructions used by the gateway processor 120 to perform its functions. For example, the memory 126 may store software instructions 128 that when executed by the gateway processor 120 causes the control device 450 to perform one or more functions described herein.

The gateway processor 120 may be one of the data processors 470 described in FIG. 4. The gateway processor 120 comprises one or more processors. The gateway processor 120 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The gateway processor 120 may be a programmable logic device, a microcontroller, a microprocessor, or any suitable combination of the preceding. The gateway processor 120 may be communicatively coupled to and in signal communication with the other components of the control device 450. The one or more processors may be configured to process data and may be implemented in hardware or software. For example, the gateway processor 120 may be 8-bit, 16-bit, 32-bit, 64-bit, or of any other suitable architecture. The gateway processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-6. In some embodiments, the function described herein is implemented using logic units, FPGAs, ASICs, DSPs, or any other suitable hardware or electronic circuitry.

Each ADC unit 122*a-c* may include a hardware processing circuitry or a hardware processor that is configured to execute software algorithms that when executed facilitate one or more autonomous operations of the autonomous vehicle 402. For example, each ADC unit 122*a-c* may be configured to facilitate engaging from non-autonomous state to autonomous state, autonomous driving of the autonomous vehicle, among others.

The ADC unit 122*a-c* may be one of the data processors 470 described in FIG. 4. The ADC unit 122*a-c* comprises one or more processors operably coupled to the other components of the control device 450, such as the gateway processor 120. The ADC unit 122*a-c* may be any electronic circuitry, including state machines, one or more CPU chips, logic units, cores (e.g., a multi-core processor), FPGAs, ASICs, or DSPs. The ADC unit 122*a-c* may be a programmable logic device, a microcontroller, a microprocessor, or any suitable combination of the preceding. The ADC unit 122*a-c* may be communicatively coupled to and in signal communication with the network interface 124, memory 126, and other components of the control device 450. The one or more processors may be configured to process data and may be implemented in hardware or software. For example, the ADC unit 122*a-c* may be 8-bit, 16-bit, 32-bit, 64-bit, or of any other suitable architecture. The ADC unit 122*a-c* may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions (e.g., autonomous instructions) to implement the functions disclosed herein, such as some or all of those described with respect to FIGS. 1-6. In some embodiments, the function described herein is implemented using logic units, FPGAs, ASICs, DSPs, or any other suitable hardware or electronic circuitry. Although FIG. 1 illustrates that the control device 450 includes three ADC units 122*a-c*, the control device 450 may include any suitable number of ADC units 122*a-c*.

The PPS synchronization unit 123 may be implemented in software and/or hardware and executed by the gateway processor 120 executing the software instructions 128, and generally be configured to synchronize the operation timing between the components of the control device 450. For example, the PPS synchronization unit 123 may distribute (or cause the gateway processor 120 to distribute) the timing for operations from the gateway processor 120 to other components of the control device 450. For example, the PPS synchronization unit 123 may distribute among the components that the timing for the executing instructions is one instruction per millisecond, two instructions per millisecond, and the like. The PPS synchronization unit 123 may be interchangeably referred to herein as a timing synchronization component.

Network interface 124 may be a component of the network communication subsystem 492 described in FIG. 4. The network interface 124 may be configured to enable wired and/or wireless communications. The network interface 124 may be configured to communicate data between the autonomous vehicle 402 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The gateway processor 120 may be configured to send and receive data using the network interface 124. The network interface 124 may be configured to use any suitable type of communication protocol as would be appreciated by one of ordinary skill in the art.

CAN controller 125 may be a component of the vehicle subsystem interface 460 described in FIG. 4. The CAN controller 125 may be configured to allow communication among the components of the control device 450 without a host computer device. The CAN controller 125 may be a message-based protocol or any other suitable type of communication protocols. The CAN controller 125 may allow serial and/or parallel data transmission. For example, for a high-priority message 140, the communication of the message 140 may be prioritized over other message 140 with lower priority levels. For example, for a high-priority message 140, the communication of the message 140 may be implemented with parallel data transmission, while other data are transmitted serially or queued in a scheduling queue according to their priority levels.

The memory 126 may be one of the data storages 490 described in FIG. 4. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-6 along with any other data, instructions, logic, rules, or code operable to implement the function(s) described herein when executed by the gateway processor 120 and/or any of the ADC units 122*a-c*. For example, the memory 126 may store software instructions 128, sensor data 130, object detection machine learning module 132, map data 134, routing plan 136, driving instructions 138, messages 140, priority levels 210, domain tag data 212, destination data 214, and/or any other data/instructions. The software instructions 128 include code that when executed by the gateway processor 120 and/or ADC unit 122*a-c* causes the control device 450 to perform the functions described herein, such as some or all of those described in FIGS. 1-6. The memory 126 comprises one or more disks, tape drives, or solid-state drives, and may be used as an over-flow data storage device to store programs when such programs are selected for execution, and to store instructions and data that are read during program execution.

Object detection machine learning modules 132 may be implemented by the gateway processor 120 and/or ADC unit 122*a-c* executing software instructions 128, and may be generally configured to detect objects and obstacles from the sensor data 130. The object detection machine learning modules 132 may be implemented using neural networks and/or machine learning algorithms for detecting objects from any data type, such as images, videos, infrared images, point clouds, audio feed, Radar data, etc.

In some embodiments, the object detection machine learning modules 132 may be implemented using machine learning algorithms, such as Support Vector Machine (SVM), Naive Bayes, Logistic Regression, k-Nearest Neighbors, Decision Trees, or the like. In some embodiments, the object detection machine learning modules 132 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 132. The object detection machine learning modules 132 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, audio feed, Radar data, etc. labeled with object(s) in each sample data. The object detection machine learning modules 132 may be trained, tested, and refined by the training dataset and the sensor data 130. The object detection machine learning modules 132 use the sensor data 130 (which are not labeled with objects) to increase their accuracy of predictions in detecting objects. For example, supervised and/or unsupervised machine learning algorithms may be used to validate the predictions of the object detection machine learning modules 132 in detecting objects in the sensor data 130.

Map data 134 may include a virtual map of a city or an area that includes the road traveled by an autonomous vehicle 402. In some examples, the map data 134 may include the map 558 and map database 1136 (see FIG. 5 for descriptions of the map 558 and map database 1136). The map data 134 may include drivable areas, such as roads, paths, highways, and undrivable areas, such as terrain (determined by the occupancy grid module 1160, see FIG. 5 for descriptions of the occupancy grid module 1160). The map data 134 may specify location coordinates of road signs, lanes, lane markings, lane boundaries, road boundaries, traffic lights, obstacles, etc.

Routing plan 136 may be a plan for traveling from a start location (e.g., a first autonomous vehicle launchpad/landing pad) to a destination (e.g., a second autonomous vehicle launchpad/landing pad). For example, the routing plan 136 may specify a combination of one or more streets, roads, and highways in a specific order from the start location to the destination. The routing plan 136 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 136 may include other information about the route from the start position to the destination, such as road/traffic signs in that routing plan 136, etc.

Figure 5:
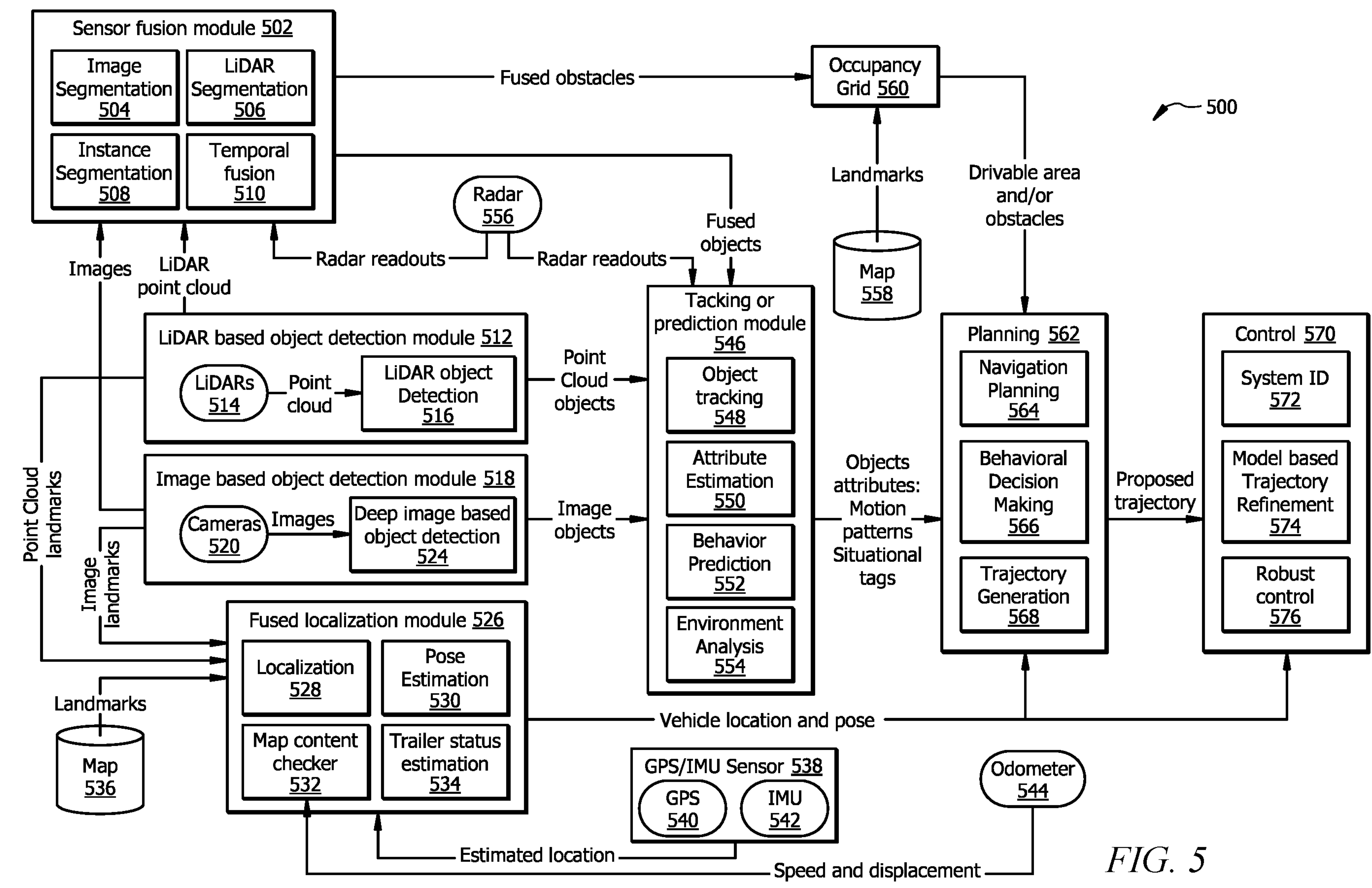
FIG. 5 illustrates an example system for providing autonomous driving operations used by the autonomous vehicle of FIG. 4.

Driving instructions 138 may be implemented by the planning module 562 (See descriptions of the planning module 562 in FIG. 5). The driving instructions 138 may include instructions and rules to adapt the autonomous driving of the autonomous vehicle 402 according to the driving rules of each stage of the routing plan 136. For example, the driving instructions 138 may include instructions to stay within the speed range of a road traveled by the autonomous vehicle 402, adapt the speed of the autonomous vehicle 402 with respect to observed changes by the sensors 446, such as speeds of surrounding vehicles, objects within the detection zones of the sensors 446, etc.

Vehicle Components Boundary Domain

The vehicle components boundary domain 104 may include a second set of components configured to facilitate non-autonomous operations of the autonomous vehicle 402. For example, the vehicle components boundary domain 104 may include components that perform mechanical operations of the autonomous vehicle 402, such as vehicle drive subsystems 442 (see FIG. 4), vehicle control subsystem 448 (see FIG. 4), among others. For example, the vehicle components boundary domain 104 may include a communication module 142, vehicle component controller 144, vehicle components 146, and authentication components 148.

The communication module 142 may be or include a hardware processor, a modem, a router, or a network interface configured to provide software and/or hardware resources to other components of the control device 450. The communication module 142 may be one of the components of the data processors 470 (see FIG. 4). The communication module 142 may be interchangeably referred to as a communication processor. The communication module 142 comprises one or more processors operably coupled to the other components of the control device 450, such as the gateway processor 120. The communication module 142 may be any electronic circuitry, including state machines, one or more CPU chips, logic units, cores (e.g., a multi-core processor), FPGAs, ASICs, or DSPs. The communication module 142 may be a programmable logic device, a microcontroller, a microprocessor, or any suitable combination of the preceding. The communication module 142 may be communicatively coupled to and in signal communication with the vehicle component controller 144, vehicle components 146, authentication components 148, and other components of the control device 450. The one or more processors may be configured to process data and may be implemented in hardware or software. For example, the communication module 142 may be 8-bit, 16-bit, 32-bit, 64-bit, or of any other suitable architecture. The communication module 142 may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions to implement the functions disclosed herein, such as some or all of those described with respect to FIGS. 1-6. In some embodiments, the function described herein is implemented using logic units, FPGAs, ASICs, DSPs, or any other suitable hardware or electronic circuitry.

The vehicle component controller 144 may include a hardware processing circuitry configured to control vehicle components 146. The vehicle component controller 144 may be associated with the vehicle control subsystem 448 described in FIG. 4. The vehicle components 146 may be any of the components in the vehicle control subsystem 448 described in FIG. 4. For example, the vehicle components 146 may include a human machine interface, a break unit, a power distribution unit, a camera array, a microphone array, a speaker array, sensors 446, among others. Each vehicle component 146 may be configured to perform its respective operations as described herein in FIG. 4. The human machine interface may be configured to provide support audio, visual, and/or message-based communication. The human machine interface may be configured to support one or two-way communication. Using the human machine interface, a person may be able to communicate via network 110 with another device (e.g., the oversight server 170) and/or with a remote operator. The power distribution unit may be implemented in hardware and/or software, and configured to distribute power to the components of the autonomous vehicle 402. The power distribution unit may be a component in the power source 442e described in FIG. 1. The components of the vehicle components boundary domain 104 are operably coupled to each other through wires and/or wireless communication.

The authentication component 148 may include a hardware processor, memory, and/or circuitry (not explicitly shown), and is generally configured to authenticate components and communication among components of the vehicle component boundary domain 104. For example, a software application designed using software code may be stored in the memory and executed by the processor to perform the functions of the authentication component 148. Examples of the authentication component 148 may include a near-field communication (NFC) device, a mobile phone (e.g., smartphone), a laptop, a computing device, and the like. The authentication component 148 is configured to communicate with other components of the vehicle components boundary domain 104 via wires and/or wireless communication.

Security Boundary Domain

The security boundary domain 106 may include a third set of components configured to facilitate authentication/authorization of any component in the control device 450, authentication of any message 140 received from an external device (e.g., oversight server 170, etc.) and messages 140 received from an internal component with respect to the control device 450 (e.g., any component of the control device 450 to another component). The security boundary domain 106 may include a memory 152. The memory 152 may be one of the data storages 490 described in FIG. 4. The memory 152 may be volatile or non-volatile and may comprise ROM, RAM, TCAM, DRAM, and SRAM. The memory 152 may include one or more of a local database, cloud database, NAS, etc. The memory 152 may store any of the information described in FIGS. 1-6 along with any other data, instructions, logic, rules, or code operable to implement the function(s) described herein when executed by the gateway processor 120 and/or any of the ADC units **122*a-c*. For example, the memory 152 may store authentication/authorization instructions 154, security keys 156, access management 158, and/or any other data/instructions. The software instructions 128 include code that when executed by the gateway processor 120 and/or ADC unit 122*a-c* cause the control device 450 to perform the functions described herein, such as some or all of those described in FIGS. 1-6. The memory 152** comprises one or more disks, tape drives, or solid-state drives, and may be used as an over-flow data storage device to store programs when such programs are selected for execution and to store instructions and data that are read during program execution.

The authentication/authorization instructions 154 include code that when executed by the gateway processor 120 and/or ADC unit **122*a-c* and/or a processor in the security boundary domain 106 cause the control device 450 to perform the functions described herein, such as authenticating a component of the control device 450 that initiates to communicate with another component, upon authenticating the component, authorizing the communication, distribute a security key 156 to each component of the control device 450** to be used for authenticating each component.

The security keys 156 may include a plurality of security keys, security code, and the like used for authenticating each component of the control device 450. The security keys 156 may also be used to establish secured communication paths between any two combinations of components in one or more boundary domains 102, 104, and 106. The security keys 156 may also be used to establish secured communication paths between any two combinations of boundary domains 102, 104, and 106. For example, the control device 450 and/or the gateway processor 120 (e.g., by executing the authentication/authorization instructions 154) may establish a trusted communication path between the autonomous vehicle components boundary domain 102 and the vehicle components boundary domain 104 by receiving an initial private security key 156 from the oversight server 170, sharing the initial private security key 156 with the communication module 142, receiving a request from the communication module 142 to communicate a message 140, e.g., to the gateway processor 120, where the request includes the message 140 and a private security key 156, receiving a private security key 156 from the communication module 142, and comparing the received private security key 156 with the initial private security key 156 (received from the oversight server 170). If it is determined that the received private security key 156 corresponds to or matches the initial private security key 156, the control device 450 may determine that the communication module 142 is authenticated and authorized to communicate the message 140, e.g., to the gateway processor 120. The control device 450 may perform a similar operation for establishing a trusted communication path between any two domains or components of the control device 450.

The access management 158 may include records of access to security keys 156 (e.g., records of components associated with particular security keys 156), and historical records of access to the security keys 156, among others. The access management 158 may indicate which component(s) is authorized to initiate a communication, i.e., trusted. The access management 158 may also indicate which component(s) is not authorized to access message(s) 140.

Oversight Server

Oversight server 170 may include one or more processing devices and is generally configured to oversee the operations of the autonomous vehicle 402 while they are in transit and oversee the traveling of the autonomous vehicle 402 and while they are at a terminal. The oversight server 170 may provide software and/or hardware resources (e.g., map data 134, routing plans 136, messages 140, recommendations, feedback from a remote operator on autonomous vehicle navigation, etc.) to the autonomous vehicles 402. The oversight server 170 may comprise a processor 172, a network interface 174, a user interface 176, and a memory 178. The components of the oversight server 170 are operably coupled with each other. The processor 172 may include one or more processing units that perform various functions of the oversight server 170. The memory 178 may store any data and/or instructions used by the processor 172 to perform its functions. For example, the memory 178 may store software instructions 180 that when executed by the processor 172 cause the oversight server 170 to perform one or more functions described herein. The oversight server 170 may be configured as shown or in any other suitable configuration.

In one embodiment, the oversight server 170 may be implemented by a cluster of computing devices that may serve to oversee the operations of the autonomous vehicle 402. For example, the oversight server 170 may be implemented by a plurality of computing devices using distributed computing and/or cloud computing systems. In another example, the oversight server 170 may be implemented by a plurality of computing devices in one or more data centers. As such, in one embodiment, the oversight server 170 may include more processing power than the control device 450. The oversight server 170 is in signal communication with the autonomous vehicle 402 and its components (e.g., the control device 450).

Processor 172 comprises one or more processors. The processor 172 may be any electronic circuitry, including state machines, one or more CPU chips, logic units, cores (e.g., a multi-core processor), FPGAs, ASICs, or DSPs. The processor 172 may be a programmable logic device, a microcontroller, a microprocessor, or any suitable combination of the preceding. The processor 172 may be communicatively coupled to and in signal communication with the network interface 174, user interface 176, and memory 178. The one or more processors are configured to process data and may be implemented in hardware or software. For example, the processor 172 may be 8-bit, 16-bit, 32-bit, 64-bit or of any other suitable architecture. The processor 172 may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 180 to implement the functions disclosed herein, such as some or all of those described with respect to FIGS. 1-6. In some embodiments, the function described herein may be implemented using logic units, FPGAs, ASICs, DSPs, or any other suitable hardware or electronic circuitry.

Network interface 174 may be configured to enable wired and/or wireless communications of the oversight server 170. The network interface 174 may be configured to communicate data between the oversight server 170 and other devices, servers, autonomous vehicles 402, systems, or domains. For example, the network interface 174 may comprise an NFC interface, a Bluetooth interface, a Zigbee interface, a Z-wave interface, an RFID interface, a WIFI interface, a LAN interface, a WAN interface, a PAN interface, a modem, a switch, and/or a router. The processor 172 may be configured to send and receive data using the network interface 174. The network interface 174 may be configured to use any suitable type of communication protocol as would be appreciated by one of ordinary skill in the art.

User interfaces 176 may include one or more user interfaces that are configured to interact with users, such as a remote operator. The remote operator may access the oversight server 170 via a communication path. In certain embodiments, the user interfaces 176 may include peripherals of the oversight server 170, such as monitors, keyboards, mouse, trackpads, touchpads, microphones, webcams, speakers, and the like. In certain embodiments, the user interface 176 may include a graphical user interface, a software application, or a web application. The remote operator may use the user interfaces 176 to access the memory 178 to review any data stored in the memory 178. The remote operator may confirm, update, and/or override the routing plan 136, messages 140, map data 134, and/or any other data stored in memory 178.

Memory 178 may be volatile or non-volatile and may comprise ROM, RAM, TCAM, DRAM, and SRAM. The memory 178 may include one or more of a local database, cloud database, NAS, etc. Memory 178 may store any of the information described in FIGS. 1-6 along with any other data, instructions, logic, rules, or code operable to implement the function(s) described herein when executed by processor 172. For example, the memory 178 may store software instructions 150, sensor data 130, object detection machine learning module 132, map data 134, routing plan 136, driving instructions 138, messages 140, and/or any other data/instructions. The software instructions 180 may include code that when executed by the processor 172 causes the oversight server 170 to perform the functions described herein, such as some or all of those described in FIGS. 1-6. The memory 178 comprises one or more disks, tape drives, or solid-state drives, and may be used as an over-flow data storage device, to store programs when such programs are selected for execution, and to store instructions and data that are read during program execution.

Figure 2:
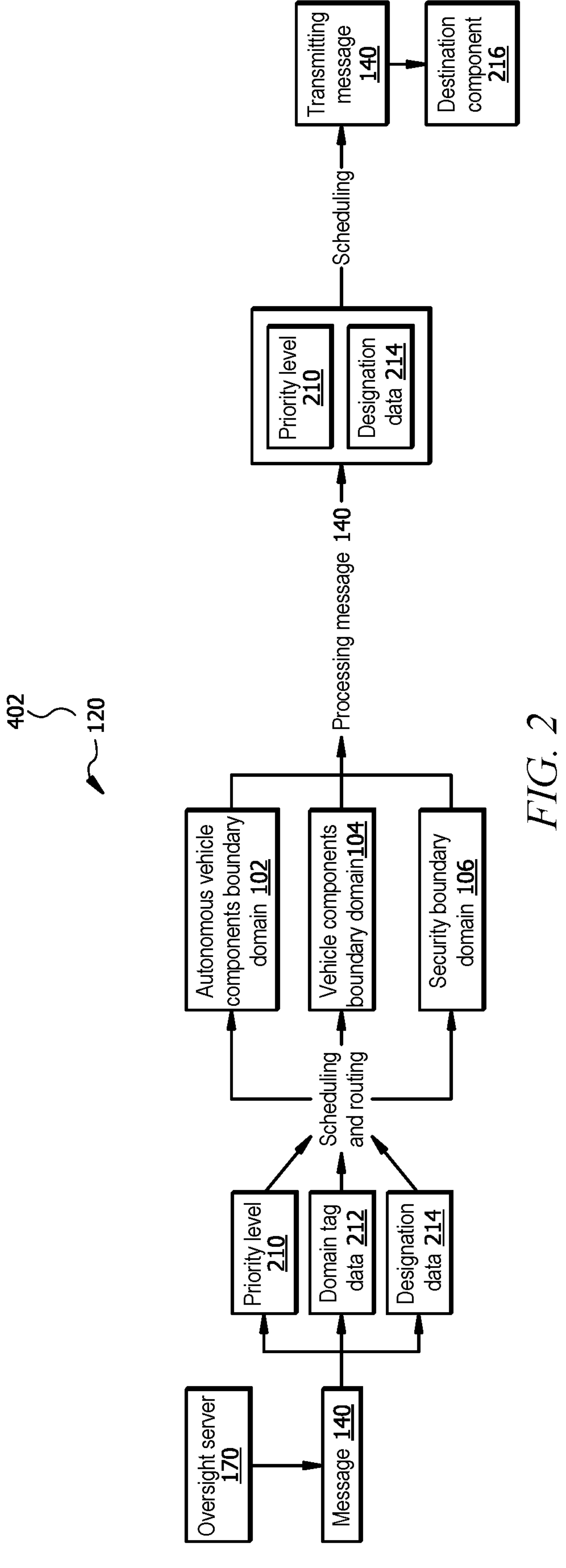
FIG. 2 illustrates an example operational flow of the system of FIG. 1.

Operational Flow for Facilitating Secured Communication for the Autonomous Vehicle FIG. 2 illustrates an example operational flow 200 of system 100 of FIG. 1 for facilitating secured communication for the autonomous vehicle 402. The gateway processor 120 may be configured to coordinate communications between the autonomous vehicle 402 and external devices, systems, such as the oversight server 170, other autonomous vehicles 402, and the like. The gateway processor 120 may also be configured to coordinate communications between the internal components of the control device 450, including components in the autonomous vehicle components boundary domain 102, the vehicle components boundary domain 104, and security boundary domain 106, similar to that described in FIG. 1. The gateway processor 120 may also be configured to coordinate communications between any combination of the autonomous vehicle components boundary domain 102, the vehicle components boundary domain 104, the security boundary domain 106, and the oversight server 170.

The operational flow 200 may begin when the gateway processor 120 receives a message 140 from the oversight server 170, e.g., via the network (110 in FIG. 1). Examples of the message 140 may include a command to engage the autonomous operations, the map data 134, an autonomous software algorithm update, a minimal risk maneuver command that comprises instructions to pull the autonomous vehicle over to a side of a road or stop the autonomous vehicle without hindering the traffic, security software instruction updates, autonomous vehicle configuration files, access management updates, diagnostics data, ADS unit 122*a-c* log data, ADC unit 122*a-c* configuration data, event triggers, human machine interface audio (e.g., when a communication path is established between with a device at the autonomous vehicle 402 and a remote operator at the oversight server 170 such that the remote operator can be heard from the device), human machine interface video (e.g., when a communication path is established between with a device at the autonomous vehicle 402 and a remote operator at the oversight server 170 such that the remote operator can be seen from the device), and any other suitable data/instruction that can be transmitted to the control device 450. The message 140 may be associated with one of the domains 102, 104, 106. For example, the message 140 may be designated to be received by a particular component in one of the domains 102, 104, 106. The message 140 may be in form of a particular data structure/format, data object fields, or software code that can be evaluated by the gateway processor 120, such as a structured data package.

Determining a Priority Level and Destination of the Message

The gateway processor 120 may evaluate the message 140 to extract information from it, for example, to determine a priority level 210, domain data 212, and destination data 214 associated with the message 140. To this end, the gateway processor 120 may parse the message 140. The priority level 210 associated with the message 140 may indicate the scheduling requirement associated with the message 140.

In certain embodiments, the priority level 210 associated with the message 140 may indicate whether the priority, e.g., for executing and/or routing the message 140 to a respective destination is low, medium, or high. In certain embodiments, determining the priority level 210 associated with the message 140 may include determining that the message 140 is associated with a priority level tag data that indicates the priority level 210 of the message 140. For example, the priority level 210 may be indicated by priority flag bits or priority data field in the message 140. For example, if the priority flag bits are “11”, it may be determined that the priority level 210 is high, if the priority flag bits are “01”, it may be determined that the priority level 210 is medium, and if the priority flag bits are “00”, it may be determined that the priority level 210 is low. Other levels of priority levels 210 may also be possible.

In certain embodiments, the priority level 210 may be indicated by a value. for example, the priority level 210 may be determined to be high when it is more than a threshold value (e.g., more than 8 out of 10), the priority level 210 may be determined to be medium when it is determined to be between two threshold values (e.g., between 4 and 8 out of 10), the priority level 210 may be determined to be low when it is determined to be less than a threshold value (e.g., less than 4 out of 10).

In certain embodiments, determining the priority level 210 associated with the message 140 may include determining that the message 140 is associated with a particular internet protocol (IP) address that is associated with the priority level 210 of the message 140. For example, different IP addresses may be used to transmit messages 140 with different priority levels 210. The control device 540 may be provided, by the oversight server 170, with a table or list of IP addresses each used to transmit messages 140 with a particular priority level 210.

In response to determining that the message 140 is associated with a first IP address (that is preset to be used for transmitting messages 140 with high priority levels based on the table of IP addresses), the gateway processor 120 may determine that the priority level 210 of the message 140 is a high priority level. In response to determining that the message 140 is associated with a second IP address (that is preset to be used for transmitting messages 140 with medium priority levels based on the table of IP addresses), the gateway processor 120 may determine that the priority level 210 of the message 140 is a medium priority level. In response to determining that the message 140 is associated with a third IP address (that is preset to be used for transmitting messages 140 with high priority levels based on the table of IP addresses), the gateway processor 120 may determine that the priority level 210 of the message 140 is a low priority level.

The gateway processor 120 may also determine a domain tag data 212 associated with the message 140. The domain tag data 212 may indicate that the message 140 is associated with or designated to a particular domain from the domains 102, 104, 106. In certain embodiments, determining the domain tag data 212 may be in response to determining a domain data (e.g., domain flag bits or domain data field) transmitted along or included in the message 140, where the domain data may indicate the particular domain for which the message is designated.

The gateway processor 120 may also identify destination data 214 associated with the message 140. The destination data 214 may indicate that the message 140 is designated to a particular component 216 within the particular domain 102, 104, 106 identified from the domain tag data 212. In some cases, the particular component 216 may be an internal software or hardware component with respect to the gateway processor 120. In some cases, the particular component 216 may be an external software or hardware component with respect to the gateway processor 120, such as any of the ADS units 122*a-c*, PPS 123, memory 126, memory 152, communication module 142, vehicle component controller 144, vehicle component 146, or any other component described in FIGS. 1, 4-6.

Scheduling the Message According to the Priority Level to the Determined Destination In the scheduling and routing operation, the gateway processor 120 may schedule the message 140 to be transmitted to the particular domain 102, 104, 106 identified from the domain tag data 212 based on the priority level 210, the domain tag data 212, and the destination data 214.

In certain embodiments, in cases where the priority level 210 associated with the message 140 is high (as indicated by priority tag data or priority data field included in the message 140, similar to that described above), scheduling the message 140 to be transmitted to particular domain 102, 104, 106 based on the priority level 210 and the identified domain tag data 212 may include moving or routing the message 140 to the top of a scheduling queue that may comprise a plurality of messages associated with various priority levels.

In certain embodiments, in a case where the priority level 210 associated with the message 140 is high (as indicated by priority tag data or priority data field included in the message 140, similar to that described above), scheduling the message 140 to be transmitted to particular domain 102, 104, 106 based on the priority level 210 and the identified domain tag data 212 may include moving or routing the message 140 to a particular scheduling queue that is dedicated for messages with high priority levels (e.g., messages with priority levels with more than a threshold value, such as more than 8 out 10).

In certain embodiments, in a case where the priority level 210 associated with the message 140 is medium (as indicated by priority tag data or priority data field included in the message 140, similar to that described above), scheduling the message 140 to be transmitted to particular domain 102, 104, 106 based on the priority level 210 and the identified domain tag data 212 may include moving or routing the message 140 to a particular scheduling queue that is dedicated for messages with medium priority levels (e.g., messages with priority levels within two thresholds, such as between 4 and 8 out of 10).

In certain embodiments, in a case where the priority level 210 associated with the message 140 is low (as indicated by priority tag data or priority data field included in the message 140, similar to that described above), scheduling the message 140 to be transmitted to particular domain 102, 104, 106 based on the priority level 210 and the identified domain tag data 212 may include moving or routing the message 140 to a particular scheduling queue that is dedicated for messages with low priority levels (e.g., messages with priority levels with less than a threshold value, such as less than 4 out 10).

In certain embodiments, the messages 140 communicated to a component within the security boundary domain 106 may not be shared with other components in the other domains 102 and 104. For example, if the message 140 is designated to be transmitted to the security boundary domain 106, the gateway processor 120 may route the message 140 to the security boundary domain 106 such that the message 140 is not shared with other domains 102, 104. This is because the message 140 may include private security keys 156 for particular components. Thus, the message 140 is not shared with other domains 102, 104.

The gateway processor 120 may route the message 140 to the particular component 216 based on the priority level 210, domain data 212, and destination data 214. The particular component 216 may receive the message 140 and execute or act upon the message 140 according to the information/instructions included in the message 140. For example, if the message 140 includes instructions to engage the autonomous functions (i.e., initiate autonomous driving of the autonomous vehicle 402), the particular component 216 may execute particular autonomous driving algorithms (and optionally instruct other related components) to engage the autonomous functions of the autonomous vehicle 402. In another example, if the message 140 includes a command to perform a minimal risk condition maneuver (e.g., pull over or stop the autonomous vehicle 402), the particular component 216 may execute particular minimal risk condition maneuver instructions (and optionally instruct other related components) to perform the minimal risk condition maneuver. In another example, if the message 140 includes the updated map data 134, the particular component 216 may use the updated map data 134 for traveling of the autonomous vehicle 402. In this manner, the gateway processor 120 may receive, process, schedule, route, and act upon an incoming message 140.

In contain embodiments, the gateway processor 120 may perform similar operations for an outgoing message 140. The outgoing message 140 may include a request to engage the autonomous functions for the autonomous vehicle 402, a location coordinate of the autonomous vehicle 402, autonomous vehicle health data, sensor data 130 captured by the sensors 464, information received from the oversight server 170, information received from another autonomous vehicle 402, and/or any other data/instructions/requests. The outgoing message 140 may be communicated to the oversight server 170, other autonomous vehicles 402, a device associated with an authorized person who is attempting to access the autonomous vehicle 402, or information associated with the autonomous vehicle 402, among others. For example, for communicating an outgoing message 140, the gateway processor 120 may process the outgoing message 140, in response determine a priority level 210 and destination data 214 associated with the outgoing message 140, schedule the outgoing message 140 (in a particular scheduling queue based on the determined priority level 210, similar to that described above with respect to an incoming message 140), and transmit the outgoing message 140 to the destination component 216 defined in the destination data 214.

Figure 3:
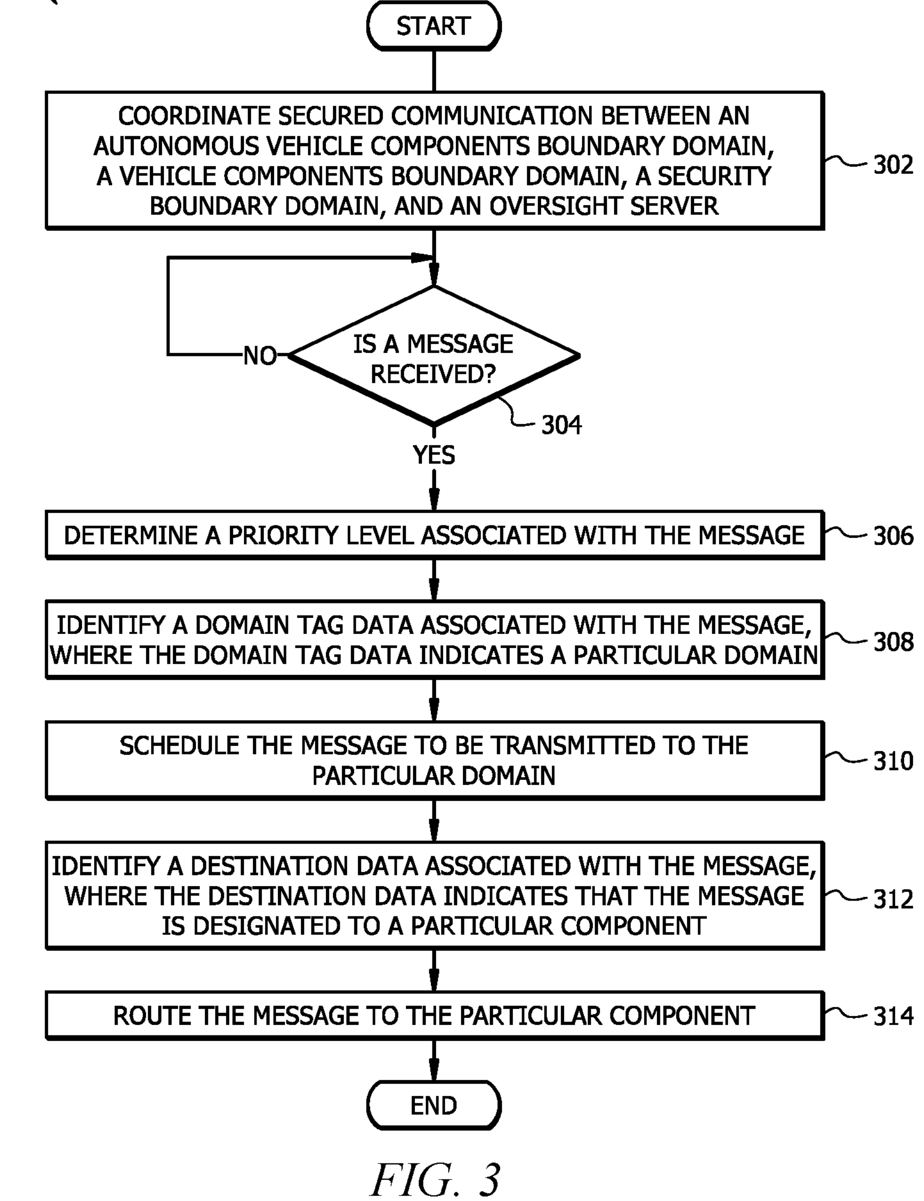
FIG. 3 illustrates an example flowchart of a method for facilitating secured and trusted communication among various components of the autonomous vehicle and route and scheduling an incoming message.

Example Method for Facilitating Secured Communication for the Autonomous Vehicle FIG. 3 illustrates an example flowchart of a method 300 for facilitating secured communication for autonomous vehicles 402. Modifications, additions, or omissions may be made to method 300. Method 300 may include more, fewer, or other operations. For example, operations may be performed in parallel or in any suitable order. While at times discussed as the system 100, autonomous vehicle 402, control device 450, the gateway processor 120, or components of any of thereof performing operations, any suitable system or components of the system may perform one or more operations of the method 300. For example, one or more operations of method 300 may be implemented, at least in part, in the form of software instructions 128 and processing instructions 480, respectively, from FIGS. 1 and 4, stored on non-transitory, tangible, machine-readable media (e.g., memory 126 and data storage 490, respectively, from FIGS. 1 and 4) that when run by one or more processors (e.g., gateway processor 120 and processor 470, respectively, from FIGS. 1 and 4) may cause the one or more processors to perform operations 302-314.

At operation 302, the control device 450 (e.g., via the gateway processor 120) coordinates secured communication between the autonomous vehicle boundary domain 102, the vehicle components boundary domain 104, the security boundary domain 106, and the oversight server 170. In this process, the control device 450 (e.g., via the gateway processor 120) may share security keys 156 among the boundary domains 102, 104, 106, where the security keys 156 are received from the oversight server 170. The control device 450 (e.g., gateway processor 120) may establish secured communication paths between any combination of the boundary domains 102, 104, 106, and oversight server 170 by sharing and/or evaluating the security keys 156, similar to that described in FIGS. 1 and 2.

At operation 304, the control device 450 (e.g., via the gateway processor 120) determines whether a message 140 is received. For example, the control device 450 (e.g., via the gateway processor 120) may determine whether the message 140 is received from the oversight server 170 or another autonomous vehicle 402. If it is determined that the message 140 is received, the method 300 may proceed to operation 306. Otherwise, the method 300 may remain at operation 304 until a message 140 is received.

At operation 306, the control device 450 (e.g., via the gateway processor 120) determines a priority level 210 associated with the message 140. To this end, the control device 450 (e.g., via the gateway processor 120) may process the message 140, for example, by extracting various data fields and/or information from the message 140, such as the priority level 210, domain tag data 212, and destination data 214, similar to that described in FIG. 2. For example, the control device 450 (e.g., via the gateway processor 120) may determine the priority level 210 associated with the message 140 from priority tag data, priority data field, and/or IP address associated with the message 140, that is used to transmit the message 140, similar to that described in FIG. 2.

At operation 308, the control device 450 (e.g., via the gateway processor 120) identifies a domain tag data 212 associated with the message 140, where the domain tag data 212 indicates a particular domain 102, 104, 106. In this process, the control device 450 (e.g., via the gateway processor 120) may identify the domain tag data 212 that is included in the message 140, similar to that described in FIG. 2.

At operation 310, the control device 450 (e.g., via the gateway processor 120) identifies a destination data 214 associated with the message 140, where the destination data 214 indicates that the message 140 is designated to a particular component 216, similar to that described in FIG. 2.

At operation 312, the control device 450 (e.g., via the gateway processor 120) schedules the message 140 to be transmitted to the particular domain 102, 104, 106. In this process, the control device 450 (e.g., via the gateway processor 120) may route the message 140 to a particular scheduling queue based on the determined priority level 210, the domain tag data 212, and the destination data 214 associated with the message 140, similar to that described in FIG. 2. At operation 314, the control device 450 (e.g., via the gateway processor 120) routes the message 140 to the particular component 216. Upon receipt of the message 140, the particular component 216 may act upon the message 140, e.g., execute commands or instructions included in the message 140.

Example Autonomous Vehicle and its Operation

FIG. 4 shows a block diagram of an example vehicle ecosystem 400 in which autonomous driving operations can be determined. As shown in FIG. 4, the autonomous vehicle 402 may be a semi-trailer truck. The vehicle ecosystem 400 may include several systems and components that can generate and/or deliver one or more sources of information/data and related services to the in-vehicle control computer 450 that may be located in an autonomous vehicle 402. The in-vehicle control computer 450 can be in data communication with a plurality of vehicle subsystems 440, all of which can be resident in the autonomous vehicle 402. A vehicle subsystem interface 460 may be provided to facilitate data communication between the in-vehicle control computer 450 and the plurality of vehicle subsystems 440. In some embodiments, the vehicle subsystem interface 460 can include a controller area network (CAN) controller to communicate with devices in the vehicle subsystems 440.

The autonomous vehicle 402 may include various vehicle subsystems that support the operation of the autonomous vehicle 402. The vehicle subsystems 440 may include a vehicle drive subsystem 442, a vehicle sensor subsystem 444, a vehicle control subsystem 448, and/or network communication subsystem 492. The components or devices of the vehicle drive subsystem 442, the vehicle sensor subsystem 444, and the vehicle control subsystem 448 shown in FIG. 4 are examples. The autonomous vehicle 402 may be configured as shown or any other configurations.

The vehicle drive subsystem 442 may include components operable to provide powered motion for the autonomous vehicle 402. In an example embodiment, the vehicle drive subsystem 442 may include an engine/motor 442*a*, wheels/tires 442*b*, a transmission 442*c*, an electrical subsystem 442*d*, and a power source 442*e*.

The vehicle sensor subsystem 444 may include a number of sensors 446 configured to sense information about an environment or condition of the autonomous vehicle 402. The vehicle sensor subsystem 444 may include one or more cameras 446*a* or image capture devices, a radar unit 446*b*, one or more thermal sensors 446*c*, a wireless communication unit 446*d* (e.g., a cellular communication transceiver), an inertial measurement unit (IMU) 446*e*, a laser range finder/LiDAR unit 446*f*, a Global Positioning System (GPS) transceiver 446*g*, a wiper control system 446*h*. The vehicle sensor subsystem 444 may also include sensors configured to monitor internal systems of the autonomous vehicle 402 (e.g., an $O_2$ monitor, a fuel gauge, an engine oil temperature, etc.).

The IMU 446*e* may include any combination of sensors (e.g., accelerometers and gyroscopes) configured to sense position and orientation changes of the autonomous vehicle 402 based on inertial acceleration. The GPS transceiver 446*g* may be any sensor configured to estimate a geographic location of the autonomous vehicle 402. For this purpose, the GPS transceiver 446*g* may include a receiver/transmitter operable to provide information regarding the position of the autonomous vehicle 402 with respect to the Earth. The radar unit 446*b* may represent a system that utilizes radio signals to sense objects within the local environment of the autonomous vehicle 402. In some embodiments, in addition to sensing the objects, the radar unit 446*b* may additionally be configured to sense the speed and the heading of the objects proximate to the autonomous vehicle 402. The laser range finder or LiDAR unit 446*f* may be any sensor configured to use lasers to sense objects in the environment in which the autonomous vehicle 402 is located. The cameras 446*a* may include one or more devices configured to capture a plurality of images of the environment of the autonomous vehicle 402. The cameras 446*a* may be still image cameras or motion video cameras.

Cameras 446*a* may be rear-facing and front-facing so that pedestrians, and any hand signals made by them, or signs held by pedestrians, may be observed from all around the autonomous vehicle. These cameras 446*a* may include video cameras, cameras with filters for specific wavelengths, as well as any other cameras suitable to detect hand signals, hand-held traffic signs, or both hand signals and hand-held traffic signs. A sound detection array, such as a microphone or array of microphones, may be included in the vehicle sensor subsystem 444. The microphones of the sound detection array may be configured to receive audio indications of the presence of, or instructions from, authorities, including sirens and commands such as "Pull over." These microphones are mounted, or located, on the external portion of the vehicle, specifically on the outside of the tractor portion of an autonomous vehicle. Microphones used may be any suitable type, mounted such that they are effective both when the autonomous vehicle is at rest, as well as when it is moving at normal driving speeds.

The vehicle control subsystem 448 may be configured to control the operation of the autonomous vehicle 402 and its components. Accordingly, the vehicle control subsystem 448 may include various elements such as a throttle and gear selector 448*a*, a brake unit 448*b*, a navigation unit 448*c*, a steering system 448*d*, and/or an autonomous control unit 448*e*. The throttle and gear selector 448*a* may be configured to control, for instance, the operating speed of the engine and, in turn, control the speed of the autonomous vehicle 402. The throttle and gear selector 448*a* may be configured to control the gear selection of the transmission. The brake unit 448*b* can include any combination of mechanisms configured to decelerate the autonomous vehicle 402. The brake unit 448*b* can slow the autonomous vehicle 402 in a standard manner, including by using friction to slow the wheels or engine braking. The brake unit 448*b* may include an anti-lock brake system (ABS) that can prevent the brakes from locking up when the brakes are applied. The navigation unit 448*c* may be any system configured to determine a driving path or route for the autonomous vehicle 402. The navigation unit 448*c* may additionally be configured to update the driving path dynamically while the autonomous vehicle 402 is in operation. In some embodiments, the navigation unit 448*c* may be configured to incorporate data from the GPS transceiver 446*g* and one or more predetermined maps so as to determine the driving path for the autonomous vehicle 402. The steering system 448*d* may represent any combination of mechanisms that may be operable to adjust the heading of autonomous vehicle 402 in an autonomous mode or in a driver-controlled mode.

The autonomous control unit 448*e* may represent a control system configured to identify, evaluate, and avoid or otherwise negotiate potential obstacles or obstructions in the environment of the autonomous vehicle 402. In general, the autonomous control unit 448*e* may be configured to control the autonomous vehicle 402 for operation without a driver or to provide driver assistance in controlling the autonomous vehicle 402. In some embodiments, the autonomous control unit 448*e* may be configured to incorporate data from the GPS transceiver 446*g*, the radar unit 446*b*, the LiDAR unit 446*f*, the cameras 446*a*, and/or other vehicle subsystems to determine the driving path or trajectory for the autonomous vehicle 402.

The network communication subsystem 492 may comprise network interfaces, such as routers, switches, modems, and/or the like. The network communication subsystem 492 may be configured to establish communication between the autonomous vehicle 402 and other systems, servers, etc. The network communication subsystem 492 may be further configured to send and receive data from and to other systems.

Many or all of the functions of the autonomous vehicle 402 can be controlled by the in-vehicle control computer 450. The in-vehicle control computer 450 may include at least one data processor 470 (which can include at least one microprocessor) that executes processing instructions 480 stored in a non-transitory computer-readable medium, such as the data storage device 490 or memory. The in-vehicle control computer 450 may also represent a plurality of computing devices that may serve to control individual components or subsystems of the autonomous vehicle 402 in a distributed fashion. In some embodiments, the data storage device 490 may contain processing instructions 480 (e.g., program logic) executable by the data processor 470 to perform various methods and/or functions of the autonomous vehicle 402, including those described with respect to FIGS. 1-6.

The data storage device 490 may contain additional instructions as well, including instructions to transmit data to, receive data from, interact with, or control one or more of the vehicle drive subsystems 442, the vehicle sensor subsystem 444, and the vehicle control subsystem 448. The in-vehicle control computer 450 can be configured to include a data processor 470 and a data storage device 490. The in-vehicle control computer 450 may control the function of the autonomous vehicle 402 based on inputs received from various vehicle subsystems (e.g., the vehicle drive subsystem 442, the vehicle sensor subsystem 444, and the vehicle control subsystem 448).

FIG. 5 shows an exemplary system 500 for providing precise autonomous driving operations. The system 500 may include several modules that can operate in the in-vehicle control computer 450, as described in FIG. 4. The in-vehicle control computer 450 may include a sensor fusion module 502 shown in the top left corner of FIG. 5, where the sensor fusion module 502 may perform at least four image or signal processing operations. The sensor fusion module 502 can obtain images from cameras located on an autonomous vehicle to perform image segmentation 504 to detect the presence of moving objects (e.g., other vehicles, pedestrians, etc.) and/or static obstacles (e.g., stop sign, speed bump, terrain, etc.) located around the autonomous vehicle. The sensor fusion module 502 can obtain LiDAR point cloud data item from LiDAR sensors located on the autonomous vehicle to perform LiDAR segmentation 506 to detect the presence of objects and/or obstacles located around the autonomous vehicle.

The sensor fusion module 502 can perform instance segmentation 508 on image and/or point cloud data items to identify an outline (e.g., boxes) around the objects and/or obstacles located around the autonomous vehicle. The sensor fusion module 502 can perform temporal fusion 510 where objects and/or obstacles from one image and/or one frame of point cloud data item are correlated with or associated with objects and/or obstacles from one or more images or frames subsequently received in time.

The sensor fusion module 502 can fuse the objects and/or obstacles from the images obtained from the camera and/or point cloud data item obtained from the LiDAR sensors. For example, the sensor fusion module 502 may determine based on a location of two cameras that an image from one of the cameras comprising one half of a vehicle located in front of the autonomous vehicle is the same as the vehicle captured by another camera. The sensor fusion module 502 may send the fused object information to the tracking or prediction module 546 and the fused obstacle information to the occupancy grid module 560. The in-vehicle control computer may include the occupancy grid module 560 which can retrieve landmarks from a map database 558 stored in the in-vehicle control computer. The occupancy grid module 560 can determine drivable areas and/or obstacles from the fused obstacles obtained from the sensor fusion module 502 and the landmarks stored in the map database 558. For example, the occupancy grid module 560 can determine that a drivable area may include a speed bump obstacle.

Below the sensor fusion module 502, the in-vehicle control computer 450 may include a LiDAR-based object detection module 512 that can perform object detection 516 based on point cloud data item obtained from the LiDAR sensors 514 located on the autonomous vehicle. The object detection 516 technique can provide a location (e.g., in 3D world coordinates) of objects from the point cloud data item. Below the LiDAR-based object detection module 512, the in-vehicle control computer may include an image-based object detection module 518 that can perform object detection 524 based on images obtained from cameras 520 located on the autonomous vehicle. For example, the object detection 518 technique can employ a deep image based object detection 524 (e.g., a machine learning technique) to provide a location (e.g., in 3D world coordinates) of objects from the image provided by the camera 520.

The radar 556 on the autonomous vehicle can scan an area in front of the autonomous vehicle or an area towards which the autonomous vehicle is driven. The radar data may be sent to the sensor fusion module 502 that can use the radar data to correlate the objects and/or obstacles detected by the radar 556 with the objects and/or obstacles detected from both the LiDAR point cloud data item and the camera image. The radar data also may be sent to the tracking or prediction module 546 that can perform data processing on the radar data to track objects by object tracking module 548 as further described below.

The in-vehicle control computer 450 (as shown in FIGS. 1 and 4) may include a tracking or prediction module 546 that receives the locations of the objects from the point cloud and the objects from the image, and the fused objects from the sensor fusion module 502. The tracking or prediction module 546 also receives the radar data with which the tracking or prediction module 546 can track objects by object tracking module 548 from one point cloud data item and one image obtained at one time instance to another (or the next) point cloud data item and another image obtained at another subsequent time instance.

The tracking or prediction module 546 may perform object attribute estimation 550 to estimate one or more attributes of an object detected in an image or point cloud data item. The one or more attributes of the object may include a type of object (e.g., a pedestrian, a car, a truck, etc.). The tracking or prediction module 546 may perform behavior prediction 552 to estimate or predict the motion pattern of an object detected in an image and/or a point cloud. The behavior prediction 552 can be performed to detect a location of an object in a set of images received at different points in time (e.g., sequential images) or in a set of point cloud data items received at different points in time (e.g., sequential point cloud data items). In some embodiments, the behavior prediction 552 can be performed for each image received from a camera and/or each point cloud data item received from the LiDAR sensor. In some embodiments, the tracking or prediction module 546 can be performed (e.g., run or executed) to reduce computational load by performing behavior prediction 552 on every other or after every pre-determined number of images received from a camera or point cloud data item received from the LiDAR sensor (e.g., after every two images or after every three-point cloud data items).

The behavior prediction 552 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking or prediction module 546 may assign motion pattern situational tags to the objects (e.g., "located at coordinates (x,y)," "stopped," "driving at 50 mph," "speeding up" or "slowing down"). The situational tags can describe the motion pattern of the object. The tracking or prediction module 546 may send the one or more object attributes (e.g., types of the objects) and motion pattern situational tags to the planning module 562. The tracking or prediction module 546 may perform an environment analysis 554 using any information acquired by the system 500 and any number and combination of its components.

The in-vehicle control computer may include the planning module 562 that receives the object attributes and motion pattern situational tags from the tracking or prediction module 546, the drivable area and/or obstacles, and the vehicle location and pose information from a fused localization module 526 (further described below).

The planning module 562 can perform navigation planning 564 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 564 may include determining an area next to the road where the autonomous vehicle can be safely parked in a case of emergencies. The planning module 562 may include behavioral decision making 566 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 562 performs trajectory generation 568 and selects a trajectory from the set of trajectories determined by the navigation planning operation 564. The selected trajectory information may be sent by the planning module 562 to the control module 570.

The in-vehicle control computer may include a control module 570 that receives the proposed trajectory from the planning module 562 and the autonomous vehicle location and pose from the fused localization module 526. The control module 570 may include a system identifier 572. The control module 570 can perform a model-based trajectory refinement 574 to refine the proposed trajectory. For example, the control module 570 can apply filtering (e.g., Kalman filter) to make the proposed trajectory data smooth and/or to minimize noise. The control module 570 may perform the robust control 576 by determining, based on the refined proposed trajectory information and current location and/or pose of the autonomous vehicle, an amount of brake pressure to apply, a steering angle, a throttle amount to control the speed of the vehicle, and/or a transmission gear. The control module 570 can send the determined brake pressure, steering angle, throttle amount, and/or transmission gear to one or more devices in the autonomous vehicle to control and facilitate precise driving operations of the autonomous vehicle.

The deep image-based object detection 524 performed by the image-based object detection module 518 can also be used to detect landmarks (e.g., stop signs, speed bumps, etc.) on the road. The fused localization module 526 obtains information about landmarks detected from images, the landmarks obtained from a map database 536 stored on the in-vehicle control computer, the landmarks detected from the point cloud data item by the LiDAR-based object detection module 512. The fused localization module 526 also obtains information about the speed and displacement from the odometer sensor 544, or a rotary encoder, and the estimated location of the autonomous vehicle from the GPS/IMU sensor 538 (i.e., GPS sensor 540 and IMU sensor 542) located on or in the autonomous vehicle. Based on this information, the fused localization module 526 can perform a localization operation 528 to determine a location of the autonomous vehicle, which can be sent to the planning module 562 and the control module 570.

The fused localization module 526 can estimate pose 530 of the autonomous vehicle based on the GPS and/or IMU sensors 538. The pose of the autonomous vehicle can be sent to the planning module 562 and the control module 570. The fused localization module 526 can also estimate status (e.g., location, possible angle of movement) of the trailer unit based on (e.g., trailer status estimation 534), for example, the information provided by the IMU sensor 542 (e.g., angular rate and/or linear velocity). The fused localization module 526 may also check the map content 532.

Figure 6:
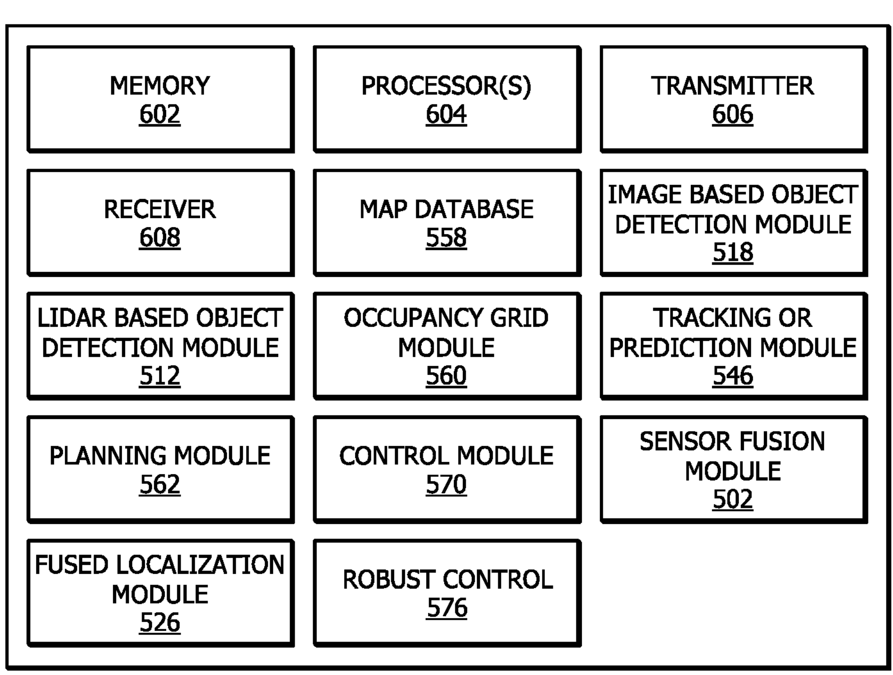
FIG. 6 illustrates a block diagram of an in-vehicle control computer included in the autonomous vehicle of FIG. 4.

FIG. 6 shows an exemplary block diagram of an in-vehicle control computer 450 included in an autonomous vehicle 402. The in-vehicle control computer 450 may include at least one processor 604 and a memory 602 having instructions stored thereupon (e.g., software instructions 128 and processing instructions 480 in FIGS. 1 and 4, respectively). The instructions, upon execution by the processor 604, configure the in-vehicle control computer 450 and/or the various modules of the in-vehicle control computer 450 to perform the operations described in FIGS. 1-6. The transmitter 606 may transmit or send information or data to one or more devices in the autonomous vehicle. For example, the transmitter 606 can send an instruction to one or more motors of the steering wheel to steer the autonomous vehicle. The receiver 608 receives information or data transmitted or sent by one or more devices. For example, the receiver 608 receives a status of the current speed from the odometer sensor or the current transmission gear from the transmission. The transmitter 606 and receiver 608 also may be configured to communicate with the plurality of vehicle subsystems 440 and the in-vehicle control computer 450 described above in FIGS. 4 and 5.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system comprising:

a memory configured to store a first message; and a gateway processor operably coupled with the memory, and configured to:

coordinate communications among an autonomous vehicle components boundary domain, a vehicle components boundary domain, and an oversight server;

receive the first message from the oversight server, wherein:

the first message is associated with one of the autonomous vehicle components boundary domain, the vehicle components boundary domain, or a security domain; and the security domain comprises a third set of components configured to facilitate authentication of received messages;

determine a priority level associated with the first message, wherein the priority level associated with the first message indicates a scheduling requirement associated with the first message;

identify a domain tag data associated with the first message, wherein the domain tag data indicates that the first message is associated with a particular domain from among the autonomous vehicle components boundary domain, the vehicle components boundary domain, or the security domain;

identify a destination data associated with the first message, wherein the destination data indicates that the first message is designated to a particular component within the particular domain;

schedule the first message to be transmitted to the particular domain based at least in part upon the priority level associated with the first message and the identified domain tag data; and route the first message to the particular component based at least in part upon the destination data.

Clause 2. The system of Clause 1, wherein the particular component is an internal software component with respect to the gateway processor.

Clause 3. The system of Clause 1, wherein the particular component is an external hardware component with respect to the gateway processor.

Clause 4. The system of Clause 1, wherein the priority level of the first message further indicates whether a priority of the first message is low, medium, or high.

Clause 5. The system of Clause 4, wherein scheduling the first message to be transmitted to the particular domain based at least in part upon the priority level associated with the first message and the identified domain tag data comprises moving the first message to a top of a scheduling queue comprising a plurality of messages associated with various priority levels in response to determining that the priority level associated with the first message is high, wherein the priority level is determined to be high when the priority level is more than a threshold value.

Clause 6. The system of Clause 4, wherein scheduling the first message to be transmitted to the particular domain based at least in part upon the priority level associated with the first message and the identified domain tag data comprises moving the first message to a scheduling queue dedicated for messages with high priority levels in response to determining that the priority level associated with the first message is high, wherein the priority level is determined to be high when the priority level is more than a threshold value.

Clause 7. The system of Clause 4, wherein scheduling the first message to be transmitted to the particular domain based at least in part upon the priority level associated with the first message and the identified domain tag data comprises moving the first message to a scheduling queue dedicated for messages with medium priority levels in response to determining that the priority level associated with the first message is medium, wherein the priority level is determined to be medium when the priority level is between a first threshold value and a second threshold value.

Clause 8. The system of Clause 4, wherein scheduling the first message to be transmitted to the particular domain based at least in part upon the priority level associated with the first message and the identified domain tag data comprises moving the first message to a scheduling queue dedicated for messages with low priority levels in response to determining that the priority level associated with the first message is low, wherein the priority level is determined to be low when the priority level is less than a threshold value.

Clause 9. A method comprising:

coordinating communication between an autonomous vehicle components boundary domain, a vehicle components boundary domain, and an oversight server;

receiving a first message from the oversight server, wherein:

the first message is associated with one of the autonomous vehicle components boundary domain, the vehicle components boundary domain, or a security domain; and the security domain comprises a third set of components configured to facilitate authentication of received messages;

determining a priority level associated with the first message, wherein the priority level associated with the first message indicates a scheduling requirement associated with the first message;

identifying a domain tag data associated with the first message, wherein the domain tag data indicates that the first message is associated with a particular domain from among the autonomous vehicle components boundary domain, the vehicle components boundary domain, or the security domain;

identifying a destination data associated with the first message, wherein the destination data indicates that the first message is designated to a particular component within the particular domain;

scheduling the first message to be transmitted to the particular domain based at least in part upon the priority level associated with the first message and the identified domain tag data; and routing the first message to the particular component based at least in part upon the destination data.

Clause 10. The method of Clause 9, wherein:

the autonomous vehicle components boundary domain comprises a first set of components configured to facilitate autonomous operations of an autonomous vehicle;

the first set of components comprises at least one of:

one or more autonomous drive compute units;

a memory associated with the autonomous vehicle;

a controller area network controller; or a timing synchronization component.

Clause 11. The method of Clause 9, wherein:

the vehicle components boundary domain comprises a second set of components configured to facilitate non-autonomous operations of an autonomous vehicle; and the second set of components comprises at least one of:

a modem;

vehicle component controller;

a human machine interface;

a break unit;

a power distribution unit;

a camera array;

a microphone array; or a speaker array.

Clause 12. The method of Clause 9, wherein the third set of components comprises at least one of:

an authentication software component; or one or more security keys used to establish secured communication paths between any two combination of the autonomous vehicle components boundary domain, the vehicle components boundary domain, and the security domain.

Clause 13. The method of Clause 9, further comprising establishing a trusted communication path between the autonomous vehicle components boundary domain and the vehicle components boundary domain.

Clause 14. The method of Clause 13, wherein establishing the trusted communication path between the autonomous vehicle components boundary domain and the vehicle components boundary domain comprises:

receiving an initial private security key from the oversight server;

sharing the initial private security key with a communication processor associated with the vehicle components boundary domain;

receiving a request from the communication processor to communicate a second message, wherein the request comprises the second message and a private security key; and determining that the received private security key corresponds to the initial private security key.

Clause 15. A non-transitory computer-readable medium storing instructions that when executed by a processor causes the processor to:

coordinate communications between an autonomous vehicle components boundary domain, a vehicle components boundary domain, and an oversight server;

receive a first message from the oversight server, wherein:

the first message is associated with one of the autonomous vehicle components boundary domain, the vehicle components boundary domain, or a security domain; and the security domain comprises a third set of components configured to facilitate authentication of received messages;

determine a priority level associated with the first message, wherein the priority level associated with the first message indicates a scheduling requirement associated with the first message;

identify a domain tag data associated with the first message, wherein the domain tag data indicates that the first message is associated with a particular domain from among the autonomous vehicle components boundary domain, the vehicle components boundary domain, or the security domain;

identify a destination data associated with the first message, wherein the destination data indicates that the first message is designated to a particular component within the particular domain;

schedule the first message to be transmitted to the particular domain based at least in part upon the priority level associated with the first message and the identified domain tag data; and route the first message to the particular component based at least in part upon the destination data.

Clause 16. The non-transitory computer-readable medium of Clause 15, wherein scheduling the first message to be transmitted to the particular domain based at least in part upon the priority level associated with the first message and the identified domain tag data comprises:

determining that the particular domain is the security domain; and in response to determining that the particular domain is the security domain, routing the first message to the security domain.

Clause 17. The non-transitory computer-readable medium of Clause 15, wherein determining the priority level associated with the first message comprises determining that the first message is associated with a priority level tag data that indicates the priority level associated with the first message.

Clause 18. The non-transitory computer-readable medium of Clause 15, wherein determining the priority level associated with the first message comprises determining that the first message is associated with a particular internet protocol (IP) address that is associated with the priority level associated with the first message.

Clause 19. The non-transitory computer-readable medium of Clause 15, wherein: in response to determining that the first message is associated with a first IP address, determine that the priority level associated with the first message is a high priority level;

in response to determining that the first message is associated with a second IP address, determine that the priority level associated with the first message is a medium priority level; and in response to determining that the first message is associated with a third IP address, determine that the priority level associated with the first message is a low priority level.

Clause 20. The non-transitory computer-readable medium of Clause 15, wherein the first message comprises one of:

a command to engage the autonomous operations;

map data that comprises a virtual map of an area where an autonomous vehicle is traveling;

an autonomous software algorithm update; or a minimal risk maneuver command that comprises instructions to pull the autonomous vehicle over or stop the autonomous vehicle.

Clause 21. The system of any of Clauses 1-8, wherein the processor is further configured to perform one or more operations of a method according to any of Clauses 9-14.

Clause 22. The system of any of Clauses 1-8, wherein the processor is further configured to perform one or more operations according to any of Clauses 15-20.

Clause 23. An apparatus comprising means for performing a method according to any of Clauses 9-14.

Clause 24. An apparatus comprising means for performing one or more instructions according to any of Clauses 15-20.

Clause 25. The non-transitory computer-readable medium of any of Clauses 15-20 storing instructions that when executed by the one or more processors further cause the one or more processors to perform one or more operations of a method according to any of Clauses 9-14 when run on a system.

The invention claimed is:

1. A system comprising:

a memory configured to store a first message; and a gateway processor operably coupled with the memory, and configured to:

coordinate communications among an autonomous vehicle components boundary domain, a vehicle components boundary domain, and an oversight server;

receive the first message from the oversight server, wherein:

the first message is associated with one of the autonomous vehicle components boundary domain, the vehicle components boundary domain, or a security domain; and the security domain comprises a third set of components configured to facilitate authentication of received messages;

determine a priority level associated with the first message, wherein the priority level associated with the first message indicates a scheduling requirement associated with the first message;

identify a domain tag data associated with the first message, wherein the domain tag data indicates that the first message is associated with a particular domain from among the autonomous vehicle components boundary domain, the vehicle components boundary domain, or the security domain;

identify a destination data associated with the first message, wherein the destination data indicates that the first message is designated to a particular component within the particular domain;

schedule the first message to be transmitted to the particular domain based at least in part upon the priority level associated with the first message and the identified domain tag data; and route the first message to the particular component based at least in part upon the destination data;

wherein the gateway processor is further configured for establishing a trusted communication path between the autonomous vehicle components boundary domain and the vehicle components boundary domain;

wherein establishing the trusted communication path between the autonomous vehicle components boundary domain and the vehicle components boundary domain comprises:

receiving an initial private security key from the oversight server;

sharing the initial private security key with a communication processor associated with the vehicle components boundary domain;

receiving a request from the communication processor to communicate a second message, wherein the request comprises the second message and a private security key; and determining that the received private security key corresponds to the initial private security key.

2. The system of claim 1, wherein the particular component is an internal software component with respect to the gateway processor.

3. The system of claim 1, wherein the particular component is an external hardware component with respect to the gateway processor.

4. The system of claim 1, wherein the priority level of the first message further indicates whether a priority of the first message is low, medium, or high.

5. The system of claim 4, wherein scheduling the first message to be transmitted to the particular domain based at least in part upon the priority level associated with the first message and the identified domain tag data comprises moving the first message to a top of a scheduling queue comprising a plurality of messages associated with various priority levels in response to determining that the priority level associated with the first message is high, wherein the priority level is determined to be high when the priority level is more than a threshold value.

6. The system of claim 4, wherein scheduling the first message to be transmitted to the particular domain based at least in part upon the priority level associated with the first message and the identified domain tag data comprises moving the first message to a scheduling queue dedicated for messages with high priority levels in response to determining that the priority level associated with the first message is high, wherein the priority level is determined to be high when the priority level is more than a threshold value.

7. System of claim 4, wherein scheduling the first message to be transmitted to the particular domain based at least in part upon the priority level associated with the first message and the identified domain tag data comprises moving the first message to a scheduling queue dedicated for messages with medium priority levels in response to determining that the priority level associated with the first message is medium, wherein the priority level is determined to be medium when the priority level is between a first threshold value and a second threshold value.

8. The system of claim 4, wherein scheduling the first message to be transmitted to the particular domain based at least in part upon the priority level associated with the first message and the identified domain tag data comprises moving the first message to a scheduling queue dedicated for messages with low priority levels in response to determining that the priority level associated with the first message is low, wherein the priority level is determined to be low when the priority level is less than a threshold value.

9. A method comprising:

coordinating communication among an autonomous vehicle components boundary domain, a vehicle components boundary domain, and an oversight server;

receiving a first message from the oversight server, wherein:

the first message is associated with one of the autonomous vehicle components boundary domain, the vehicle components boundary domain, or a security domain; and the security domain comprises a third set of components configured to facilitate authentication of received messages;

determining a priority level associated with the first message, wherein the priority level associated with the first message indicates a scheduling requirement associated with the first message;

identifying a domain tag data associated with the first message, wherein the domain tag data indicates that the first message is associated with a particular domain from among the autonomous vehicle components boundary domain, the vehicle components boundary domain, or the security domain;

identifying a destination data associated with the first message, wherein the destination data indicates that the first message is designated to a particular component within the particular domain;

scheduling the first message to be transmitted to the particular domain based at least in part upon the priority level associated with the first message and the identified domain tag data; and routing the first message to the particular component based at least in part upon the destination data;

wherein the method further comprising establishing a trusted communication path between the autonomous vehicle components boundary domain and the vehicle components boundary domain;

wherein establishing the trusted communication path between the autonomous vehicle components boundary domain and the vehicle components boundary domain comprises:

receiving an initial private security key from the oversight server;

sharing the initial private security key with a communication processor associated with the vehicle components boundary domain;

receiving a request from the communication processor to communicate a second message, wherein the request comprises the second message and a private security key; and determining that the received private security key corresponds to the initial private security key.

10. The method of claim 9, wherein:

the autonomous vehicle components boundary domain comprises a first set of components configured to facilitate autonomous operations of an autonomous vehicle;

the first set of components comprises at least one of:

one or more autonomous drive compute units;

a memory associated with the autonomous vehicle;

a controller area network controller; or a timing synchronization component.

11. The method of claim 9, wherein:

the vehicle components boundary domain comprises a second set of components configured to facilitate non-autonomous operations of an autonomous vehicle; and the second set of components comprises at least one of:

a modem;

vehicle component controller;

a human machine interface;

a break unit;

a power distribution unit;

a camera array;

a microphone array; or a speaker array.

12. The method of claim 9, wherein the third set of components comprises at least one of:

an authentication software component; or one or more security keys used to establish secured communication paths between any two combination of the autonomous vehicle components boundary domain, the vehicle components boundary domain, and the security domain.

13. A non-transitory computer-readable medium storing instructions that when executed by a processor causes the processor to:

coordinate communications among an autonomous vehicle components boundary domain, a vehicle components boundary domain, and an oversight server;

receive a first message from the oversight server, wherein:

the first message is associated with one of the autonomous vehicle components boundary domain, the vehicle components boundary domain, or a security domain; and the security domain comprises a third set of components configured to facilitate authentication of received messages;

determine a priority level associated with the first message, wherein the priority level associated with the first message indicates a scheduling requirement associated with the first message;

identify a domain tag data associated with the first message, wherein the domain tag data indicates that the first message is associated with a particular domain from among the autonomous vehicle components boundary domain, the vehicle components boundary domain, or the security domain;

identify a destination data associated with the first message, wherein the destination data indicates that the first message is designated to a particular component within the particular domain;

schedule the first message to be transmitted to the particular domain based at least in part upon the priority level associated with the first message and the identified domain tag data; and route the first message to the particular component based at least in part upon the destination data;

wherein the instructions further cause the processor to establish a trusted communication path between the autonomous vehicle components boundary domain and the vehicle components boundary domain;

wherein establishing the trusted communication path between the autonomous vehicle components boundary domain and the vehicle components boundary domain comprises:

receiving an initial private security key from the oversight server;

sharing the initial private security key with a communication processor associated with the vehicle components boundary domain;

receiving a request from the communication processor to communicate a second message, wherein the request comprises the second message and a private security key; and determining that the received private security key corresponds to the initial private security key.

14. The non-transitory computer-readable medium of claim 13, wherein scheduling the first message to be transmitted to the particular domain based at least in part upon the priority level associated with the first message and the identified domain tag data comprises:

determining that the particular domain is the security domain; and in response to determining that the particular domain is the security domain, routing the first message to the security domain.

15. The non-transitory computer-readable medium of claim 13, wherein determining the priority level associated with the first message comprises determining that the first message is associated with a priority level tag data that indicates the priority level associated with the first message.

16. The non-transitory computer-readable medium of claim 13, wherein determining the priority level associated with the first message comprises determining that the first message is associated with a particular internet protocol (IP) address that is associated with the priority level associated with the first message.

17. The non-transitory computer-readable medium of claim 13, wherein:

in response to determining that the first message is associated with a first IP address, determine that the priority level associated with the first message is a high priority level;

in response to determining that the first message is associated with a second IP address, determine that the priority level associated with the first message is a medium priority level; and in response to determining that the first message is associated with a third IP address, determine that the priority level associated with the first message is a low priority level.

18. The non-transitory computer-readable medium of claim 13, wherein the first message comprises one of:

a command to engage autonomous operations of the autonomous vehicle;

map data that comprises a virtual map of an area where an autonomous vehicle is traveling;

an autonomous software algorithm update; or a minimal risk maneuver command that comprises instructions to pull the autonomous vehicle over or stop the autonomous vehicle.

* * * * *